United States Patent [19]
Douglas et al.

[11] Patent Number: 5,319,464
[45] Date of Patent: Jun. 7, 1994

[54] SCHEDULING COLOR VARIATIONS FOR DISCRETE JOB ELEMENTS

[75] Inventors: Wilbert D. Douglas, Pittsford; Chung-Mei Sung, Rochester, both of N.Y.

[73] Assignee: Xerox Corporation, Stamford, Conn.

[21] Appl. No.: 134,782

[22] Filed: Oct. 12, 1993

Related U.S. Application Data

[62] Division of Ser. No. 922,888, Jul. 31, 1992, Pat. No. 5,281,998.

[51] Int. Cl.$^5$ .................... G03G 15/01; H04N 1/46
[52] U.S. Cl. ................... 358/296; 355/202; 355/328; 395/114
[58] Field of Search ........... 355/200, 202, 218, 326 R, 355/328; 358/537, 538, 540, 296; 395/109, 114

[56] References Cited

U.S. PATENT DOCUMENTS

| | | | |
|---|---|---|---|
| 4,982,234 | 1/1991 | Fillion et al. | 355/209 |
| 5,075,787 | 12/1991 | Shaughnessy et al. | 358/452 |
| 5,179,637 | 1/1993 | Nardozzi | 395/114 |

Primary Examiner—Jan H. Pendegrass
Attorney, Agent, or Firm—Ronald F. Chapuran

[57] ABSTRACT

A system for providing a memory for storing electronic images with color mode marks and a control for providing images in optional color modes for producing a set of images with discrete elements of the set of images processed in a selected color mode independent of the color mode other elements. This is accomplished by identifying elements of the set of images with color code marks and responding to the color code marks to alter the operation of the machine dependent upon the identified color mode mark. The machine pitches are also changed to provide additional features such as simplex and duplex mode to selected images.

11 Claims, 4 Drawing Sheets

SCHEDULING COLOR VARIATIONS FOR DISCRETE JOB ELEMENTS

This is a division of application Ser. No. 07/922,888, filed Jul. 31, 1992 now U.S. Pat. No. 5,281,998.

BACKGROUND OF THE INVENTION

This invention relates generally to methods and apparatus for scheduling the printing or reproduction of images and, more particularly, to the separate scheduling of the printing or reproduction of images in response to the identification of one of a plurality of color modes for each individual image.

If imaging machines are to become more versatile in completing complex jobs, the machine control must be able to adapt to a wide variety of requirements in an efficient manner. Modern business and document needs oftentimes dictate the need for multi color prints or images in a variety of colors, usually interspersed among other black and white documents. In addition, there is often the demand for selected images in a set to incorporate other features such as simplex or duplex mode. A suitable control must be able to accurately and efficiently schedule the machine for coordinating these various features in a complex set of images wherein many of the images require individually tailored features to provide an accurate completed set.

It is known in the prior art to be able to provide selected documents in a set of documents with different features. For example, U.S. Pat. No. 4,982,234 discloses a user interface screen for programming different features for individual documents or groups of documents in a set of documents in a black and white reproduction machine.

However one difficulty with the prior art systems is the limitation to black and white reproductions or to only one highlight color and the inability to select discrete images, pages, or copy sheets in an image set to receive distinct color images. Another difficulty is to be able to provide other features such as discrete pages in the simplex or duplex mode in the image set. In particular, it is desirable to be able to print distinct images having two or more highlight colors as well as black and white in an image set, in addition to providing selected simplex or duplex modes.

It is an object, therefore, of the present invention to provide a new and improved system for providing multiple colors to selected images of an image set. Another object of the present invention is to provide a method of designating individual color images in an image set in either a simplex or duplex mode. Another object of the present invention is to be able to adjust machine timing or delay machine timing pitches in order to selectively apply different color modes to individual images in an image set. Other advantages of the present invention will become apparent as the following description proceeds, and the features characterizing the invention will be pointed out with particularity in the claims annexed to and forming a part of this specification.

SUMMARY OF THE INVENTION

The present invention is concerned with a system for providing a memory for storing electronic images with color mode marks and a control for providing images in optional color modes for producing a set of images with discrete elements of the set of images processed in a selected color mode independent of the color mode of other elements. This is accomplished by identifying elements of the set of images with color mode code marks and responding to the color mode marks to alter the operation of the machine dependent upon the identified color mode mark. The machine pitches are also changed to provide additional features such as simplex and duplex mode to selected images.

For a better understanding of the present invention, reference may be had to the accompanying drawings wherein the same reference numerals have been applied to like parts and wherein:

DETAILED DESCRIPTION OF THE PREFERRED EMBODIMENT

Figure 1:
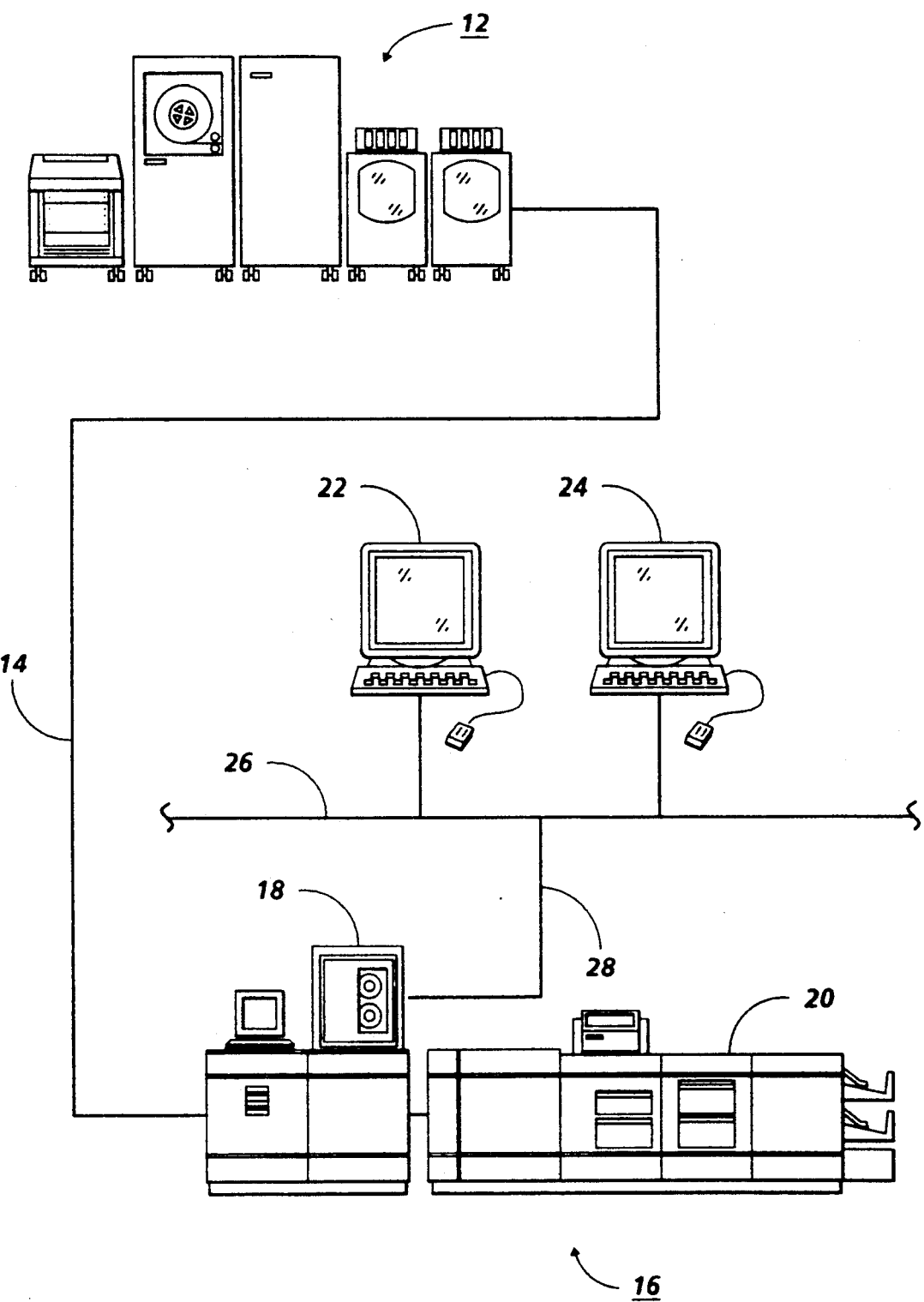
FIG. 1 is a block diagram of a typical network incorporating the present invention illustrating.

With respect to FIG. 1, there is generally illustrated an information transmission and printing system suitable for incorporating the present invention. In particular, a central computer system 12, is interconnected over a communication line 14 to an electronic imaging and printing system generally illustrated at 16 including an electronic subsystem 18 and an input output terminal 20 (IOT). For details of a typical electronic imaging and printing system, reference is made to U.S. Ser. No. 07/736,375, incorporated herein. In addition, various workstations or network users are illustrated at 22 and 24 connected to a common network 26, in turn the common network 26, is interconnected to electronic subsystem (ESS) 18 via communication channel 28. It should be understood that FIG. 1, is merely exemplary of many typical communication networks interconnecting various workstations and users to a common printing system.

Figure 2:
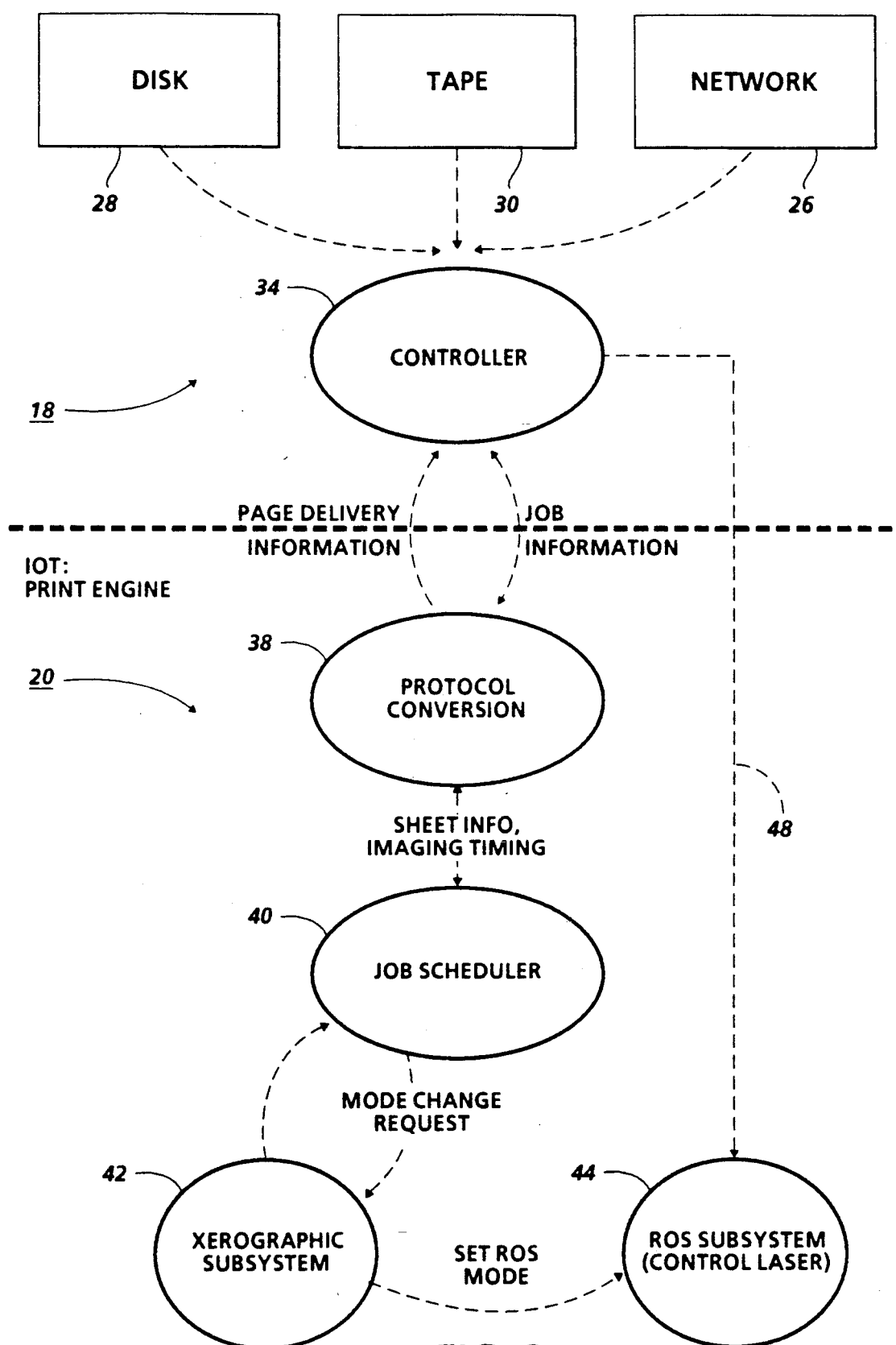
FIG. 2 is a diagram of the control in accordance with the present invention.

With reference to FIG. 2, there is illustrated in general diagram form the job scheduling technique in accordance with the present invention. The scheduling technique allows the machine to cycle up in a given printer mode and yet be able to schedule discrete elements of a printer job in alternate modes to the given cycled up mode. Specifically, in a preferred embodiment, a printer job can be scheduled for either high lite color, monochrome-color or monochrome-black imaging on a sheet by sheet basis without cycling down the printer.

The job scheduling technique responds to any job requirement received by a printer such as a laser printer, for example, to schedule any combination of job sheets. Each of the sheets could have discrete print characteristics or operating modes. To give specific requirements to specific job sheets, mode change requests are received from a controller. When a start print command is received by the printer, the job scheduler will cause the printer to dead cycle as required while initiating the mode changes or providing the specific characteristics for each sheet of the job. If, for example, there is a operating mode change received from the controller, from one page to the next, within a job, a scheduling sequence for transition from one mode to another is organized to allow the input output terminal to finish imaging the last sheet of the current mode before scheduling any side one sheets of the next mode. In addition, when printing in a duplex mode, mode changes from one page to the next are accomplished by delaying the scheduling of side one of the subsequent duplex page until side 2 of the current page has been imaged.

After the last image of a current mode has been scheduled, the job scheduler will cause the printer to dead cycle as required prior to initiating a mode change. This will maintain the same mode until the latent image has passed the last physical process location in the xerographic process which could affect image quality. Dead cycles are inserted by the job scheduler control after initiating a mode change to provide the xerographics system time to respond to the change requests.

With reference to FIG. 2, the diagram is divided into the electronic subsystem 18, shown above the dotted line and the print engine or IOT 20, shown below the dotted line. Within the ESS 18 is controller 34 with the primary function of setting up job information for the print engine 20. Job information can be communicated to the controller 34 from various job sources such as a disk 28, tape 30, or the network 26. In other words, a job source could have been set up by an operator and stored on disk 28, set up by the operator and stored on tape 30, or a job source or document could have been created by network user and information come to the controller via the network 26.

Within the print engine 20, there is a protocol conversion operation 38 for decoding and packing job information for the print engine or the controller. The protocol conversion operation 38 is interconnected to job scheduler 40 that handles the overall print engine job scheduling and exchanges sheet information imaging and imaging timing information with the protocol conversion operation 38. The job scheduler 40, conveys mode change requests to the xerographic subsystem 42 of the printer 20 and provides suitable dead cycles for the xerographic subsystem 42 to enable the appropriate mode changes, including the appropriate setting of the raster output scanner ROS 44 of the IOT 20. As illustrated, there is also a communication link 48 between controller 34 and ROS 44 to convey image data information.

Figure 3A:
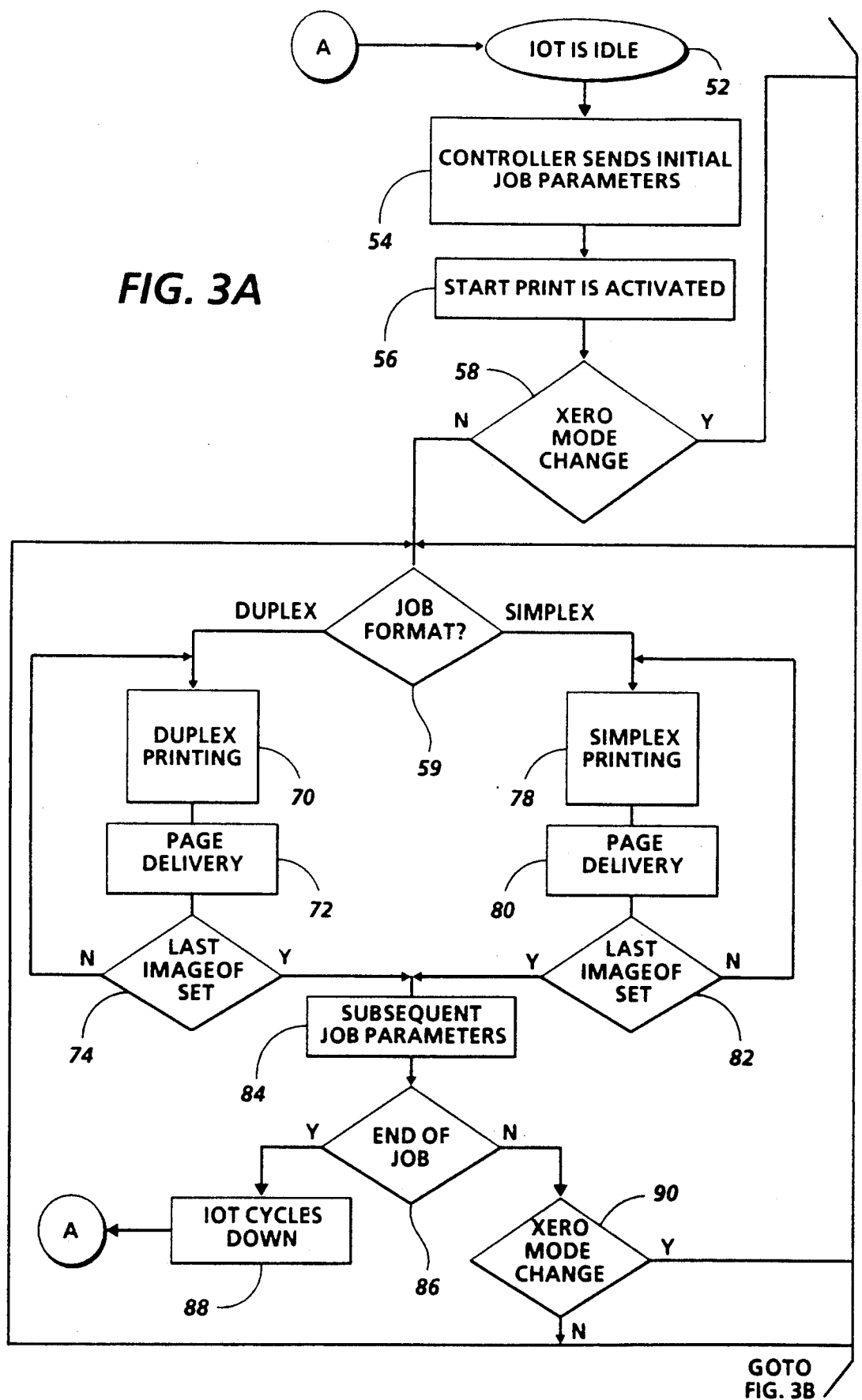
FIG. 3A and 3B is a flow chart illustrating the scheduling of mode and format job transitions in accordance with the present invention.
Figure 3B:
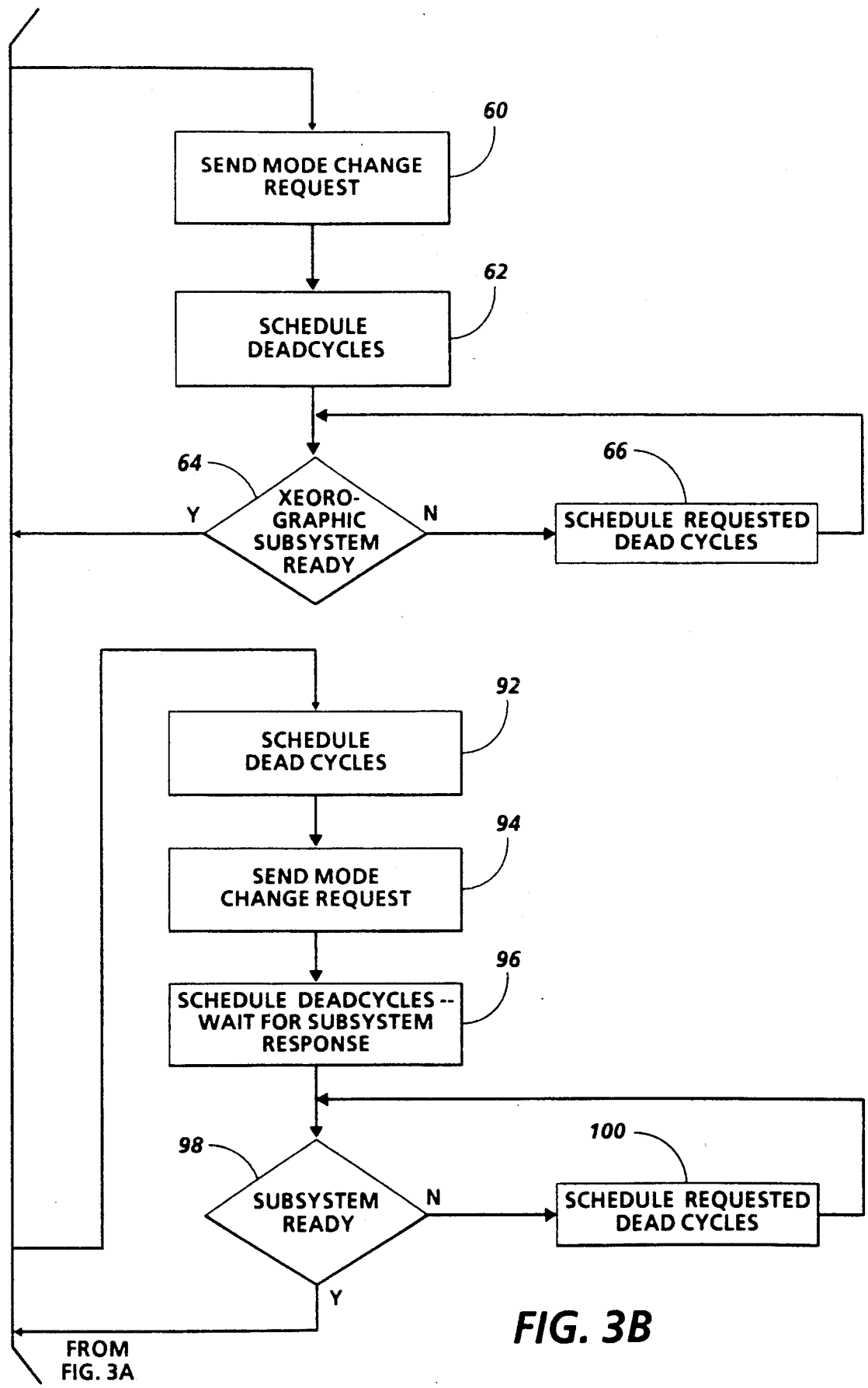

With reference to FIG. 3, there is illustrated a flow chart of the scheduling technique in accordance with the present invention. Assume that the IOT or printer is in an idle mode as illustrated at block 52. With reference to block 54, the controller 34 sends initial job parameters specifying the xerographic mode and format. In other words, this could be parameters identifying a particular color such as high-lite color, monochrome-color or monochrome-black for a specific sheet or whether or not a particular sheet or sheets are to be in a simplex or duplex mode. At block 56, the start print is activated to cycle up the printer and at 58, a decision is made as to whether or not a change has to be made for the next sheet from the previous sheet or job format.

If there is to be a change in the mode from a previous job, a mode change request is sent to the xerographic system as illustrated at 60. The scheduler then schedules suitable dead cycles and waits for the subsystem response as shown at block 62. The decision block 64 merely queries whether or not the xerographic subsystem is ready, and if not, the job scheduler schedules the requested dead cycles at 66.

Once the xerographic subsystem is ready at decision block 64, or there is no xerographic mode change from the previous job at decision block 58, a decision is then made as to the job format, whether duplex or simplex at decision block 59. If there is a duplex mode then the IOT performs duplex printing as illustrated at block 70, there is a monitoring or report of page delivery at block 72 and at block 74 the decision as to whether or not the last image of the set has been processed. If not, the procedure loops back to block 70 where the IOT continues to perform duplex printing. If it is the last image of the set then the procedure goes to block 84 for subsequent job parameters as shown at block 84. On the other hand, if the format is for simplex, the IOT performs simplex printing as shown at block 78, reports page delivery at block 80, and determines whether or not it is the last image of the set at decision block 82. If not, as in duplex printing, the procedure loops back to block 78 for the IOT to continue to perform simplex printing. If it is the last image of the set, then as in duplex printing, subsequent job parameters are then obtained as shown at block 84.

Decision block 86, determines whether or not there is an end of job. If it is an end of job, the IOT cycles down as shown at block 88. If it is not the end of job, decision block 90 then determines a xerographic mode change. If no xerographic mode change, the system then cycles back to determine the job format as shown at decision block 59. If there is a xerographic mode change, the scheduler will schedule dead cycles and any mid job transitions required as shown at block 92. The mode change requests are sent to the xerographic system as shown at block 96. At block 98, there is then a decision as to whether or not the xerographic subsystem is ready. If not, the system loops back to block 98. If the subsystem is ready, the system loops back to job format decision block 59 and repeats the process.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

What is claimed is:

1. In a printing system electrically interconnected to a plurality of electronic workstations over a common network, the printing system receiving job requirements over the common network, the printing system including a controller, a protocol conversion device, a job scheduler, and a printing subsystem, the protocol conversion device being interconnected to the controller and the job scheduler, the method of providing selected color modes for discrete portions of a job requirement comprising the steps of;

receiving a job requirement at the controller from the network and providing selected color mode job parameters, decoding by the protocol conversion device of the color mode job parameters for conveying to the job scheduler, upon receiving the color mode job parameters, conveying mode change requests and dead cycles to the printing subsystem by the job scheduler, and completing the job requirement by the printing subsystem by providing selected color modes for discrete portions of the job requirement in response to the job scheduler.

2. The method of claim 1 wherein the printing system includes a disk memory for storing job requirements.

3. The method of claim 1 wherein the printing system includes a tape memory for storing job requirements.

4. The method of claim 1 wherein the printing system is responsive to a given electronic workstation to complete job requirements.

5. The method of claim 1 wherein the printing system includes a laser printer.

6. The method of claim 1 wherein the protocol conversion device exchanges color mode and timing parameters with the job scheduler.

7. In a printing system electrically interconnected to a plurality of electronic workstations over a common network, the printing system including a main memory device, the printing system receiving job requirements from the main memory device, the printing system including a controller, a print scheduler, and a printing subsystem, the method of providing selected printing modes for discrete portions of a job requirement comprising the steps of;

receiving a job requirement at the controller from the main memory device and providing said selected printing modes to the job scheduler, conveying mode change requests to the printing subsystem in response to the receipt of the selected printing modes by the job scheduler, and completing the job requirement by the printing subsystem by providing selected printing modes for discrete portions of the job requirement in response to the mode change requests provided by the job scheduler.

8. The method of claim 7 wherein the step of providing selected printing modes for discrete portions of the job requirement in response to the mode change requests provided by the job scheduler includes the steps of altering the pitch cycles in the machine.

9. The method of claim 7 wherein the printing modes include black and white and color modes.

10. The method of claim 7 wherein the step of providing selected printing modes for discrete portions of the job requirement includes the step of altering pitch cycles.

11. The method of claim 7 wherein the step of receiving a job requirement at the controller includes the step of receiving selected printing modes for discrete portions of the job requirement over the common network.

* * * * *